(12) United States Patent
Beaujot

(10) Patent No.: US 9,795,072 B2
(45) Date of Patent: Oct. 24, 2017

(54) BIASING APPARATUS FOR FLOATING HITCH IMPLEMENTS

(75) Inventor: Norbert Beaujot, Emerald Park (CA)

(73) Assignee: SeedMaster Manufacturing Ltd., Emerald Park, SK (CA)

(*) Notice: Subject to any disclaimer, the term of this patent is extended or adjusted under 35 U.S.C. 154(b) by 236 days.

(21) Appl. No.: 12/998,798

(22) PCT Filed: Nov. 30, 2009

(86) PCT No.: PCT/CA2009/001727
§ 371 (c)(1),
(2), (4) Date: Sep. 9, 2011

(87) PCT Pub. No.: WO2010/063101
PCT Pub. Date: Jun. 10, 2010

(65) Prior Publication Data
US 2011/0315412 A1  Dec. 29, 2011

(30) Foreign Application Priority Data
Dec. 2, 2008  (CA) ..................... 2645522

(51) Int. Cl.
*A01B 63/14*  (2006.01)
(52) U.S. Cl.
CPC .................. *A01B 63/145* (2013.01)
(58) Field of Classification Search
CPC ..................... A01B 63/145; A01B 63/22
USPC ............... 172/605, 396, 467, 678
See application file for complete search history.

(56) References Cited

U.S. PATENT DOCUMENTS

| 1,732,703 | A | * | 10/1929 | Tedell | 172/605 |
| 2,847,231 | A | * | 8/1958 | Miller | B60D 1/34 |
| | | | | | 280/405.1 |
| 2,957,531 | A | * | 10/1960 | Krause | 172/317 |
| 3,116,074 | A | * | 12/1963 | Koontz | B62D 53/068 |
| | | | | | 280/407.1 |
| 3,202,225 | A | * | 8/1965 | Richardson | 172/328 |
| 3,284,097 | A | * | 11/1966 | Konntz | B62D 53/068 |
| | | | | | 280/405.1 |
| 3,766,989 | A | * | 10/1973 | Lepp | 172/605 |
| 3,912,017 | A | | 10/1975 | Rehn | |
| 3,912,018 | A | * | 10/1975 | Brundage et al. | 172/328 |
| 4,373,591 | A | * | 2/1983 | Schaaf et al. | 172/328 |
| 4,391,334 | A | * | 7/1983 | Carrick | 172/326 |

(Continued)

*Primary Examiner* — Thomas B Will
*Assistant Examiner* — Joel F. Mitchell
(74) *Attorney, Agent, or Firm* — Nixon & Vanderhye P.C.

(57) ABSTRACT

A biasing apparatus attaches to an agricultural implement comprising an implement frame mounted on front and rear wheels for travel in an operating travel direction, and a floating hitch assembly pivotally attached to the implement frame. The apparatus includes a tether attached to a rearward frame member of the implement frame, and attached to the floating hitch assembly forward of the hitch pivot axis such that the tether extends under a forward frame member of the implement frame and under the hitch pivot axis. A bias element exerts a main bias force on the tether to put the tether in tension drawing the floating hitch assembly toward the rearward frame member such that a downward bias force is exerted on the floating hitch assembly and a downward bias force is exerted on the rear frame member, and such that an upward bias force is exerted at the hitch pivot axis.

12 Claims, 3 Drawing Sheets

(56) References Cited

U.S. PATENT DOCUMENTS

| | | | | |
|---|---|---|---|---|
| 4,408,777 A | * | 10/1983 | Carrick | 172/327 |
| 4,428,435 A | * | 1/1984 | Hubbard et al. | 172/328 |
| 6,397,953 B1 | | 6/2002 | Ankenman | |
| 6,626,246 B2 | | 9/2003 | Gerber et al. | |

* cited by examiner

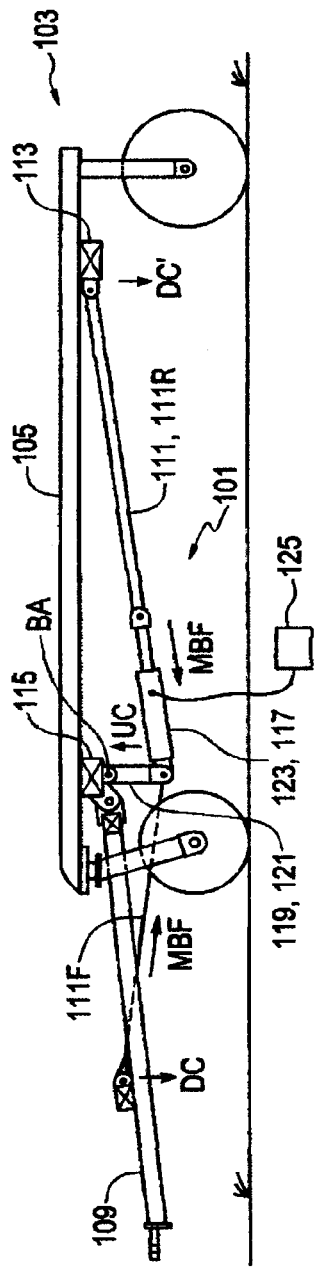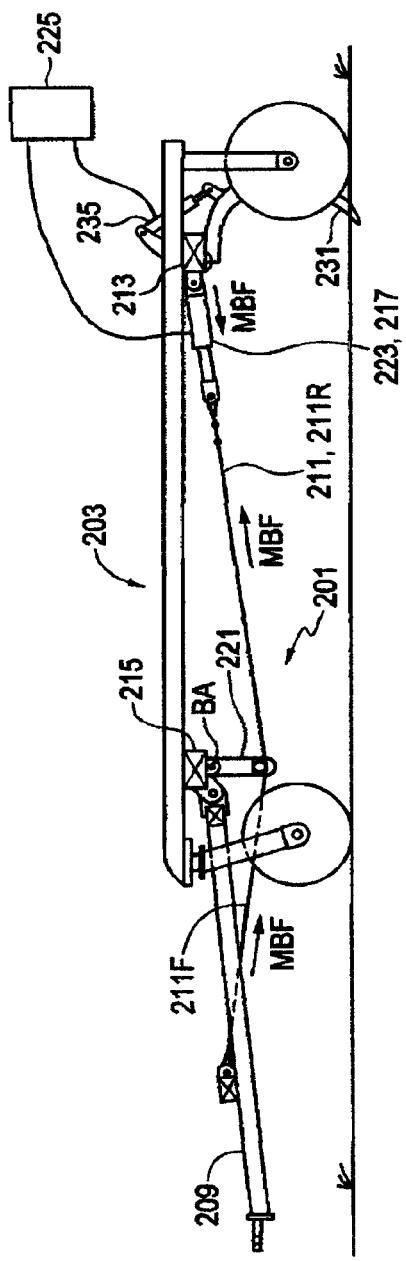

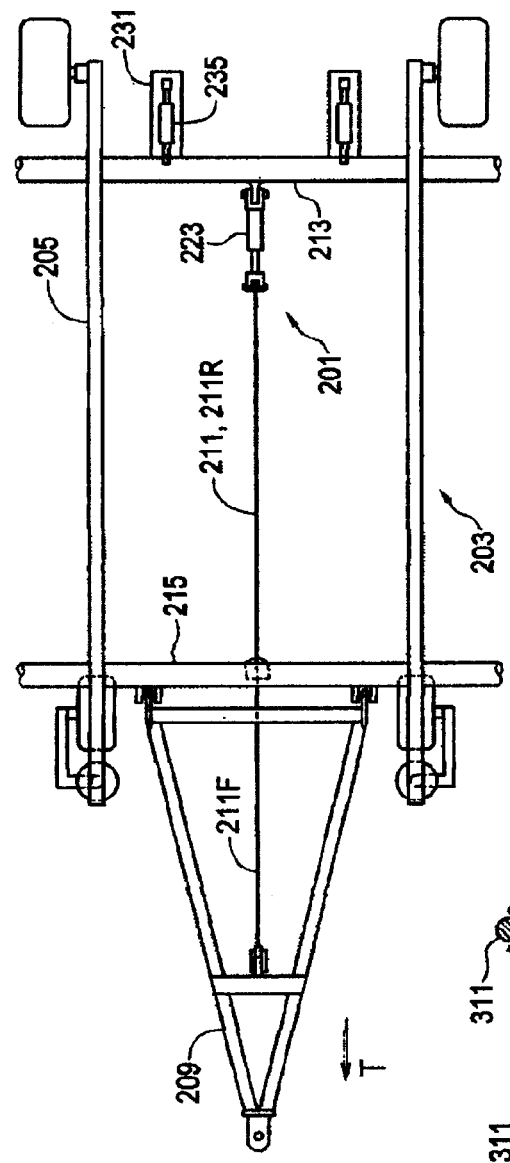
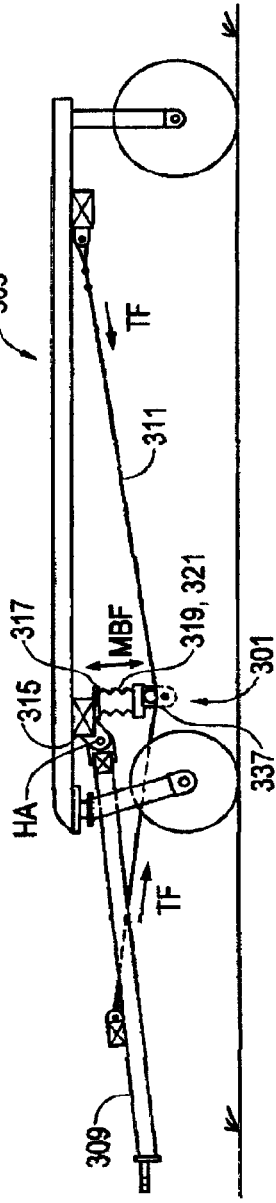

BIASING APPARATUS FOR FLOATING HITCH IMPLEMENTS

This application is the U.S. national phase of International Application No. PCT/CA2009/001727 filed 30 Nov. 2009 which designated the U.S. and claims priority to CA Patent Application No. 2645522 filed 2 Dec. 2008, the entire contents of each of which are hereby incorporated by reference.

This invention is in the field of towed implements such as are used in agriculture, and in particular such implements with a floating hitch.

BACKGROUND

Agricultural implements such as cultivators, seeders, and the like commonly comprise a frame configured to extend laterally from a central hitch where a tractor is connected for towing the implement. In one type of implement the hitch is fixed relative to the implement frame, and the frame weight, and any down force on the frame caused by ground working implements, is carried partially on the tractor drawbar and partially by wheels mounted under the frame. The fixed hitch must be mounted to the towing tractor at a specific vertical location such that the implement frame is level from front to rear when at a working position.

In another type of implement a "floating" hitch is pivotally attached to the implement frame about a pivot axis oriented horizontally and perpendicular to the operating travel direction. The implement frame is mounted on front and rear wheels to keep the frame level from front to rear. Typically the front wheels are caster wheels to allow the implement to turn. The frame weight, and any down force on the frame, is carried by the front and rear wheels. The hitch connects to the tractor drawbar without any particular regard to the vertical position of the drawbar, and only the weight of the front end of the floating hitch is carried by the tractor drawbar, while the rear end of the floating hitch is carried by the implement frame, and thus the wheels. The floating hitch pivots up and down with respect to the tractor drawbar and the implement frame as the tractor and implement move across a field and as terrain varies.

On floating hitch equipment the tractor drawbar attachment location often results in an added downward force on the front of the main frame. The most convenient and structurally sound mount location for the floating hitch is on to the front main frame member which is typically at a high location on the implement frame. The tractor draw bar is relatively low so the end result of the towing draft force on the high frame location is a downward force component on the front of the implement frame, which adds additional downward force to the implement's front wheels in addition to the weight of the implement which contributes to sinking in muddy fields. The draft force on the high frame location also creates an upward force component of some degree on the rear end of the implement frame, and an upward force component on the tractor draw bar, which effectively removes weight from the driving wheels of the tractor and reduces traction. The downward force on the front and the upward force on the rear of the implement frame may be problematic in varying penetration of ground engaging tools between tools mounted to the front compared to tools mounted to the rear of the frame.

Floating hitch equipment typically has the hitch mounted to the front cross member of the main frame at two pivot points. The mount and hitch movement must be configured to avoid the caster wheels and transmit all the draft forces to these two points. These high draft forces, concentrated at two point locations, are problematic for designing frame members and connections.

To overcome the downward force problem some implements are built with the hitch mount pivots located somewhat below the main frame front beam so that the draft force does not pull down. While this helps in reducing the downward force component, and thus reduces the downward force on the front wheels, such a hitch mount location adds significant forces and further complicates the design of the frame members and connections of the implement frame.

SUMMARY OF THE INVENTION

It is an object of the present invention to provide a biasing apparatus for floating hitch implements that overcomes problems in the prior art.

The invention provides, in one embodiment, a biasing apparatus for attachment to an agricultural implement comprising an implement frame mounted on front and rear wheels for travel in an operating travel direction, and a floating hitch assembly pivotally attached to a front portion of the implement frame about a hitch pivot axis oriented substantially horizontally and perpendicular to the operating travel direction. The apparatus comprises a tether adapted at a rear end thereof for attachment to a rearward frame member of the implement frame, and adapted at a front end thereof for attachment to the floating hitch assembly forward of the hitch pivot axis such that the tether extends under a forward frame member of the implement frame and under the hitch pivot axis. A bias element is operative to exert a main bias force on the tether to put the tether in tension drawing the floating hitch assembly toward the rearward frame member such that a downward bias force is exerted on the floating hitch assembly and a downward bias force is exerted on the rear frame member, and such that an upward bias force is exerted at the hitch pivot axis.

In a second embodiment the invention provides an agricultural implement apparatus comprising an implement frame mounted on front and rear wheels for travel in an operating travel direction, and a floating hitch assembly pivotally attached to a front portion of the implement frame about a hitch pivot axis oriented substantially horizontally and perpendicular to the operating travel direction. A tether is attached at a rear end thereof to a rearward frame member of the implement frame, and is attached at a front end thereof to the floating hitch assembly forward of the hitch pivot axis such that the tether extends under a forward frame member of the implement frame and under the hitch pivot axis. A bias element is operative to exert a main bias force on the tether to put the tether in tension drawing the floating hitch assembly toward the rearward frame member such that a downward bias force is exerted on the floating hitch assembly and a downward bias force is exerted on the rear frame member, and such that an upward bias force is exerted at the hitch pivot axis.

The apparatus of the invention adds an upward force to the front of the frame to counteract the downward force caused by the floating hitch assembly, and also adds a downward force at the rear of the implement to counteract the upward force on the rear of the implement that results from the floating hitch assembly and frame configuration.

The apparatus also reduces the forward draft force component on the front of the main frame by transferring a portion of the forward draft component to the rear of the frame, and thereby reduces stress on the front frame members.

The biasing apparatus of the invention is convenient and economical to provide, especially so where the bias element is a hydraulic cylinder and where an active hydraulic source is already required for the implement on which the apparatus is installed.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 is a schematic side view of a floating hitch agricultural implement with an alternate embodiment of the biasing apparatus installed thereon;

FIG. 4 is a schematic side view of a floating hitch agricultural implement with an alternate embodiment of the biasing apparatus installed thereon;

FIG. 5 is a top view of the implement and biasing apparatus of FIG. 4;

FIG. 6 is a schematic side view of a floating hitch agricultural implement with a further alternate embodiment of the biasing apparatus installed thereon;

FIG. 7 is a schematic front view of a cable guide of the apparatus of FIG. 6 comprising a grooved slip guide;

FIG. 8 is a schematic front view of an alternate cable guide of the apparatus of FIG. 6 comprising a rotating pulley.

DETAILED DESCRIPTION OF THE ILLUSTRATED EMBODIMENTS

Figure 1:
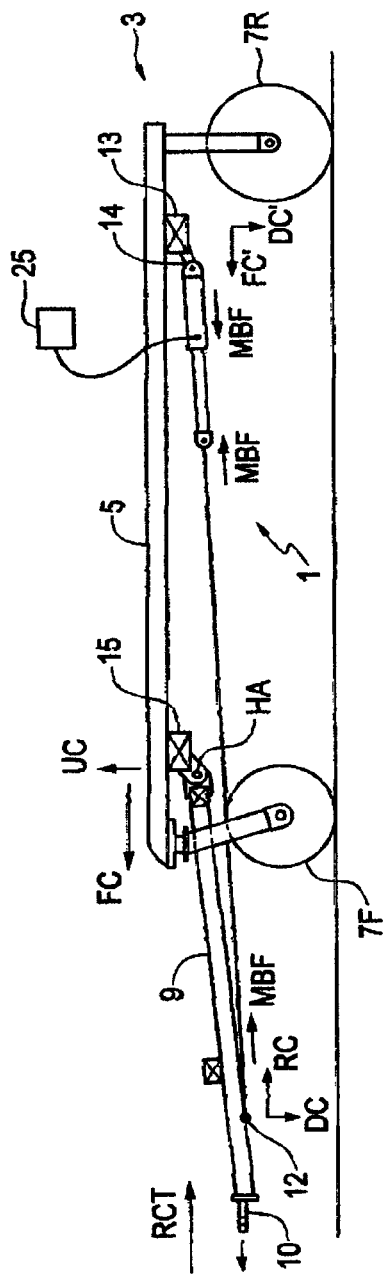
FIG. 1 is a schematic side view of a floating hitch agricultural implement with an embodiment of the biasing apparatus of the invention installed on the implement.

FIG. 1 schematically illustrates an embodiment of a biasing apparatus 1 of the present invention for attachment to an agricultural implement 3 with a floating hitch.

Figure 2:
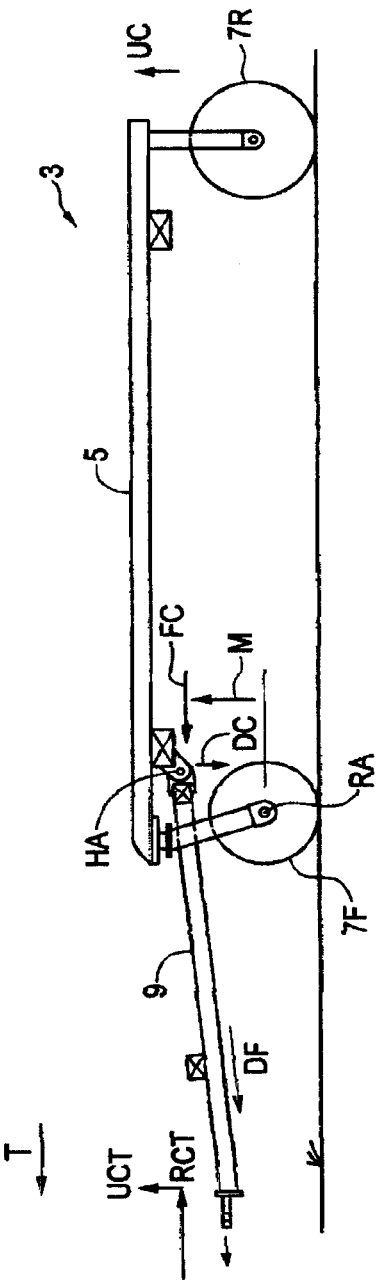
FIG. 2 is a schematic side view of the implement of FIG. 1 without the biasing apparatus installed showing the forces exerted on the implement frame when a towing tractor is pulling the implement.

The prior art implement 3 is illustrated in FIG. 2 and comprises an implement frame 5 mounted on front and rear wheels 7F, 7R for travel in an operating travel direction T. A floating hitch assembly 9 is pivotally attached to a front portion of the implement frame 5 about a hitch pivot axis HA oriented substantially horizontally and perpendicular to the operating travel direction T. In operation a towing tractor (not shown) is attached to the front end 10 of the floating hitch assembly 9 and exerts a draft force DF on the front end 10 of the floating hitch assembly 9. Because the tractor draw bar is typically lower than the attachment point to the implement frame 5 at the hitch pivot axis HA, the draft force is exerted at the hitch pivot axis in a forward and downward direction as indicated by the arrow DF. The draft force DF at the hitch pivot axis HA thus has a forward component FC, which is desirable and required to pull the implement in the forward operating travel direction T, and an undesirable downward component DC which pulls the front end of the implement downward.

Similarly the draft force DF at the tractor draw bar at the front end 10 of the floating hitch assembly 9 has a rearward component RCT, which is exerted to pull the implement forward, and an undesirable upward component UCT which pulls the draw bar of the tractor upward, reducing weight on the driving wheels of the tractor, and undesirably reducing traction.

Since the implement frame 5 is mounted on the wheels 7F located below the hitch pivot axis HA, the forward force component FC also creates a moment about the rotational axis RA of the front wheels 7F such that an upward force component UC is exerted on the rear of the implement frame 5. The added downward force component DC on the front of the frame 5 combined with the upward component UC on the rear end of the frame can cause uneven penetration between tools mounted to the front compared to tools mounted to the rear of the frame 5.

In operation as the implement 3 and towing tractor move along a field the floating hitch assembly 9 will move up and down about the hitch pivot axis HA as the terrain being traveled varies. The implement 3 will typically be a cultivator, airseeder, or the like such as are well known in the agricultural industry for field operations of various kinds.

The biasing apparatus 1 of FIG. 1 comprises a tether 11 adapted at a rear end thereof for attachment to a rearward frame member 13 of the implement frame 5, and adapted at a front end thereof for attachment to the floating hitch assembly 9 forward of the hitch pivot axis HA such that the tether 11 extends under a forward frame member 15 of the implement frame 5 and also under the hitch pivot axis HA. A bias element 17 is operative to exert a main bias force MBF on the tether 11 to put the tether in tension drawing the floating hitch assembly 9 toward the rearward frame member 13 such that a downward bias force component DC, and a rearward bias force component RC are exerted on the floating hitch assembly 9 at the attachment point 12 and a downward bias force component DC' and a forward bias force component FC' are exerted on the rear frame member 13 at the attachment point 14.

Thus the illustrated biasing apparatus 1 of FIG. 1 exerts downward and rearward forces DC, RC on the floating hitch assembly 9 and downward and forward forces DC' and FC' on the rear frame member 13 which tend to scissor the implement 3 about the hitch pivot axis HA and exert an upward force UC on the front of the implement frame 5 at the hitch pivot axis HA. The upward force UC on the hitch pivot axis HA is equal to the sum of the downward force components DC and DC'.

Further the rearward draft force component RCT exerted at the front end 10 of the floating hitch assembly 9 is equal to the forward force component FC' on the rear frame member 13, and the forward force component FC on the hitch pivot axis HA. Thus in addition to exerting a desirable upward force on the front of the implement frame 5, and a desirable downward force on the rear of the frame 5 to counteract the forces exerted by the floating hitch assembly 9 in FIG. 2, the draft forces required to pull the implement 3 forward are distributed between the hitch pivot axis HA on the front frame member 15, and the rear frame member 13. Thus stress is reduced in the implement frame 5 since it is not necessary to transfer all the force required to pull the implement from the front frame member to the intermediate and rear frame members.

The apparatus 1 thus provides a beneficial upward force on the front portion of the implement 3 that counteracts the downward force component DC described above with respect to FIG. 2, and a beneficial downward force on the rear portion of the implement 3 that counteracts the upward force component UC described above with respect to FIG. 2. The biasing apparatus 1 causes beneficial increased down force on the drawbar of the towing tractor at the front end 10 of the floating hitch assembly 9 beneficially increasing the weight on the driving wheels of the tractor, and thus improving traction.

In the illustrated embodiments the "forward" and "rearward" frame members are shown schematically as the very front and very rear members on the illustrated implement frames. In practice on some implements there will be other frame members that are forward or rearward of the frame member to which the apparatus of the invention is attached, and the terms "forward" and "rearward" are used only to refer to the relative positions of the frame members in question.

In the apparatus 1 of FIG. 1, the bias element 17 is provided by a hydraulic cylinder 23 that is incorporated into the tether 11 and exerts a longitudinal main bias force MBF on the tether 11 that puts the tether 11 in tension. In operation the implement 3 is connected to towing tractor and the hydraulic cylinder 23 is connected to an active hydraulic source 25 provided by the tractor that is operative to supply hydraulic fluid to the hydraulic cylinder 23 at a substantially constant bias pressure such that the hydraulic cylinder 23 exerts a substantially constant main bias force MBF. As is known in the art the active hydraulic source 25 is operative to allow hydraulic fluid to flow out of the hydraulic cylinder 23 when a force is exerted on the hydraulic cylinder 23 that is greater than the bias force MBF such that as the tractor and 3 move along a field the floating hitch assembly 9 moves up and down about the hitch pivot axis HA as the terrain being traveled varies, and the hydraulic cylinder 23 extends and retracts while exerting the constant main bias force MBF, and the brace 21 pivots as forward and rearward about the brace axis BA as required.

FIG. 3 illustrates an alternate embodiment of the biasing apparatus 101 mounted to a floating hitch agricultural implement 103. The bias element 117 is operative to exert a main bias force MBF on the tether 111 to put the tether 111 in tension, and a link 119 is provided between the forward frame member 115 and the tether 111. The tether 111 and link 119 are configured such that the main bias force MBF provided by the bias element 117 exerts an upward bias force component UC on the forward frame member 115 through the link 119, and exerts a downward bias force component DC on the floating hitch assembly 109. The arrangement also causes a downward bias force component DC' on the rearward frame member 113 where the tether 11 is attached.

As can be seen in the geometry of the tether in FIG. 3 compared to FIG. 1 the link 119 pushes the middle of the tether 111 down increasing the degree of downward angle at the front and rear ends thereof and thereby increasing the downward component of the forces on the floating hitch assembly 109 and the rear frame member 113. It can be seen in FIG. 1 that as the floating hitch assembly 9 moves up and down the vertical distance between the tether 11 and the hitch pivot axis HA will vary considerably, and in fact the tether can move to a vertical position the same as or even higher than that of the hitch pivot axis HA. If the tether 11 moves to vertical position equal to or higher than the hitch pivot axis the beneficial force transfers upward on the front of the frame 5 and downward on the rear of the frame 5 no longer occur. Providing the link 119 to keep the tether 111 down away from the hitch pivot axis HA as in the apparatus of FIG. 3 will maintain the beneficial forces as the floating hitch assembly 109 moves up and down.

In the apparatus 101 illustrated in FIG. 3, the link 119 comprises a brace 121 adapted for attachment to the forward frame member 115 such that the brace 121 extends downward from the forward frame member 115 and engages the tether 111 such that the tether 111 extends forward and downward from the rearward frame member 113 to the brace 121 and upward and forward from the brace 121 to the floating hitch assembly 109. The brace 121 here is pivotally attached to the forward frame member 115 at brace axis BA and the tether 111 comprises a front tether 111F provided by a cable attached to the brace 121 and the floating hitch assembly 109, and a rear tether 111R provided by a rigid rod, tube, bar, or the like pivotally attached to the brace 121 and the rearward frame member 113.

In the apparatus 101 of FIG. 3, the bias element 117 is again provided by a hydraulic cylinder 123 that is incorporated into the tether 111 and exerts a longitudinal main bias force MBF on the tether 111 that puts the tether 111, comprising the front and rear tethers 111F, 111R, in tension. The hydraulic cylinder 123 is connected to an active hydraulic source 125 as described above.

In operation as the tractor and implement move along a field the floating hitch assembly 109 moves up and down about the hitch pivot axis HA as the terrain being traveled varies, and the hydraulic cylinder 123 extends and retracts while exerting the constant main bias force MBF, and the brace 121 pivots as forward and rearward about the brace axis BA as required.

FIGS. 4 and 5 illustrate an alternate embodiment of the biasing apparatus 201 where the bias element 217 is again provided by a hydraulic cylinder 223 that is, in this embodiment, attached to the rearward frame member 213 and is again incorporated into the tether 211 and exerts a longitudinal main bias force MBF on the tether 211. The tether 211 includes a rear tether portion 211R provided by a cable attached to the hydraulic cylinder 223 and the brace 221, and a front tether portion 211F provided by a cable attached to the brace 221 and the floating hitch assembly 209. Again the brace is pivotally attached to the forward frame member 215 about brace axis BA.

The implement 203 illustrated in FIGS. 4 and 5 includes plurality of ground engaging tools 231 mounted on the frame 205 and tool hydraulic cylinders 235 connected to an active hydraulic source 225. The tool hydraulic cylinders 235 are operative to exert a tool bias force on the ground engaging tools 231 to engage the ground engaging tools 231 in the ground. The hydraulic cylinder 223 of the biasing apparatus 201 is conveniently connected to the active hydraulic source 225 of the implement 203. The diameter of the hydraulic cylinder 223 can be selected to provide the desired main bias force MBF when operated with the same hydraulic pressure as is used to operate the tool hydraulic cylinders 235.

Where the active hydraulic source 225 is shared by the hydraulic cylinder 223 of the biasing apparatus 201 and the tool hydraulic cylinders 235, hydraulic pressure is typically released to raise the furrow openers for transport, or when turning at headlands. There will then be no pressure in the hydraulic cylinder 223 of the apparatus 201 either, however no working forces are being exerted and so this lack presents no problems.

If the available pressure is not sufficient to provide the desired main bias force a second biasing apparatus could be provided. As seen in the top view of FIG. 5, the apparatus 201 is centered so that the tether 211 is substantially aligned with the operating travel direction T and is substantially aligned with a centerline of the implement 203. Where increased bias forces are desired, or where other circumstances dictate, a pair of tethers and bias elements could be provided with one of the pair spaced on each side of the centerline.

FIG. 6 illustrates a further alternate embodiment of the biasing apparatus 301 where the link 319 between the forward frame member 315 and the tether 311 is provided by a brace 321 that is rigidly attached to the forward frame member 315. The bias element 317 is incorporated into the link 319 and exerts a lateral main bias force MBF on the tether 311. The bias element 317 is illustrated as a spring or air bag, but could also again be a hydraulic cylinder or any similar bias element such is known in the art.

The tether 311 is illustrated as a cable attached to the floating hitch 309 and the rearward frame member 313, and the lateral main bias force MBF again puts the tether 311 in tension such that a tension force TF is exerted at each end of the tether 311. The main bias force MBF is selected to provide the desired tension force TF in the tether 311, rather than providing the tension force directly as in the embodiment where the bias force is exerted longitudinally on the tether 311 as described above. The main bias force MBF exerted against the tether 311 causes a reactive upward force on the forward frame member 315 that is equal to the main bias force MBF. The resulting forces on the apparatus 301 and implement 303 are similar to those discussed above with respect to the apparatus 1 of FIG. 1, and thus accomplish the same beneficial functions.

Since the brace 321 is rigid, and the tether 311 will move somewhat with respect to the brace 321 as the floating hitch assembly 309 moves up and down about the hitch pivot axis HA, the bottom end of the brace 321 includes a cable guide 337 at a lower end thereof. The cable guide 337 can be provided for example by a grooved slip guide 341 as illustrated in FIG. 7, or a rotating pulley 343 as illustrated in FIG. 8, or by other means known in the mechanical arts for maintaining the tether 311 in the desired lateral location while allowing same to move with respect to the brace 321 as required.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
   a rigid implement frame and front and rear wheels attached to corresponding front and rear portions of the implement frame located in proximity to corresponding front and rear ends of the implement frame and supporting the implement frame on a ground surface during travel in an operating travel direction;
   a floating hitch assembly pivotally attached to a front portion of the implement frame about a hitch pivot axis that is rearward of a rotational axis of the front wheels and oriented substantially horizontally and perpendicular to the operating travel direction and configured such that the floating hitch assembly is capable of pivoting up and down with respect to the implement frame;
   a tether extending under the implement frame and attached at a rear end thereof to a rearward frame member rigidly attached to the implement frame in proximity to the rear end of the implement frame, and attached at a front end thereof to the floating hitch assembly forward of the hitch pivot axis and forward of the front wheels such that the tether extends under a forward frame member of the implement frame and under the hitch pivot axis;
   a bias element located below the implement frame and operative to exert a main bias force on the tether to put the tether in tension drawing the floating hitch assembly toward the rearward frame member such that a downward bias force is exerted on the floating hitch assembly and a downward bias force is exerted on the rear frame member and the rear end of the implement frame, and such that an upward bias force is exerted at the hitch pivot axis.

2. The apparatus of claim 1 further comprising a link between the forward frame member and the tether and wherein the tether and link are configured such that the bias element exerts an upward bias force on the forward frame member through the link.

3. The apparatus of claim 2 wherein the link comprises a brace attached to the forward frame member such that the brace extends downward from the forward frame member and engages the tether such that the tether extends forward and downward from the rearward frame member to the brace and forward from the brace to the floating hitch assembly.

4. The apparatus of claim 3 wherein the brace is pivotally attached to the forward frame member and wherein the tether comprises a front tether attached between the brace and the floating hitch assembly, and a rear tether attached between the brace and the rearward frame member.

5. The apparatus of claim 3 wherein the brace is rigidly attached to the forward frame member and includes a cable guide at a lower end thereof, and wherein the tether comprises a cable attached between the floating hitch and the rearward frame member and engaged in the cable guide.

6. The apparatus of claim 1 wherein the bias element is incorporated into the tether and exerts a longitudinal bias force on the tether.

7. The apparatus of claim 3 wherein the bias element is incorporated into the brace and exerts a lateral bias force on the tether.

8. The apparatus of claim 1 wherein the tether comprises at least one of a cable, a rod, and a rigid metal member.

9. The apparatus of claim 1 wherein the bias element comprises one of a hydraulic cylinder, an air bag, and a spring.

10. The apparatus of claim 1 wherein the tether is substantially aligned with the operating travel direction and is substantially aligned with a centerline of the implement.

11. The apparatus of claim 9 further comprising a plurality of ground engaging tools mounted on the frame and tool hydraulic cylinders connected to an active hydraulic source, the tool hydraulic cylinders operative to exert a tool bias force on the ground engaging tools to engage the ground engaging tools in the ground, and wherein the bias element comprises a hydraulic cylinder connected to the active hydraulic source.

12. The apparatus of claim 11, wherein a diameter of the hydraulic cylinder is selected to provide a desired main bias force when operated with the same hydraulic pressure as is used to operate the tool hydraulic cylinders.

* * * * *